US005987259A

United States Patent [19]
Goebel

[11] Patent Number: 5,987,259
[45] Date of Patent: Nov. 16, 1999

[54] FUNCTIONAL UNIT SWITCHING FOR THE ALLOCATION OF REGISTERS

[75] Inventor: Kurt J. Goebel, Mountain View, Calif.

[73] Assignee: Sun Microsystems, Inc., Palo Alto, Calif.

[21] Appl. No.: 08/885,567

[22] Filed: Jun. 30, 1997

[51] Int. Cl.[6] ............................................... G06F 9/45
[52] U.S. Cl. ............................................. 395/709; 395/390
[58] Field of Search ................................... 395/390, 393, 395/394, 561–564, 705, 706, 707, 708, 709, 800.01

[56] References Cited

U.S. PATENT DOCUMENTS

| 4,571,678 | 2/1986 | Chaitin | 395/707 |
|---|---|---|---|
| 4,763,255 | 8/1988 | Hopkins et al. | 395/709 |
| 4,782,444 | 11/1988 | Munshi et al. | 395/709 |
| 5,233,691 | 8/1993 | Ando et al. | 395/872 |
| 5,249,295 | 9/1993 | Briggs et al. | 395/709 |
| 5,418,958 | 5/1995 | Goebel et al. | 395/709 |
| 5,481,706 | 1/1996 | Peek | 395/726 |
| 5,590,329 | 12/1996 | Goodnow, II et al. | 395/708 |
| 5,651,125 | 7/1997 | Witt et al. | 395/394 |
| 5,664,136 | 9/1997 | Witt et al. | 395/384 |
| 5,854,929 | 12/1998 | Van Praet et al. | 395/705 |

OTHER PUBLICATIONS

Weaver, David L et al., "The SPARC Architecture Manual", Prentice Hall, (1994) Version 9, pp. 294–298.

Aho, Alfred V. et al., "Intermediate Code Generation", *Compilers Principles, Techniques and Tools,* Chapter 8, Addison–Wesley, (1988) pp. 463–512.

Chin et al., "Register Allocation for GaAs Computer Systems", Proc. of the Twenty–First Ann. Hawaii Int'l Conf. on System Sciences, pp. 266–274, 1988.

Lai et al., "Estimating Register Cost Using Spots", TENCO 92 IEEE Region 10 Int'l Conference, pp. 101–105 vol. 1, 1992.

Foster III et al., "An Empirical Investigation of the Hafia Register Allocation Technique in the GNU C Compiler", Proc. IEEE, Southeastcon '92 , pp. 776–779 vol. 2, 1992.

Mahlke et al., "Compiler Code Transformations for Superscalar–based High Performance Systems", Supercomputing '92, pp. 808–817, 1992.

Meleis et al., "Optimal Local Register Allocation for a Multiple–Issue Machine", Proc. of ACM ICS '94, pp. 107–116, 1994.

Boquist, "Interprocedural Register Allocation for Lazy Functional Languages", Proc. of 7th Int. Conf. FPCA '95, pp. 270–281, 1995.

Norris et al. "An Experimental Study of Several Cooperative Register Allocation and Instruction Scheduling Strategies", Proc. of the 28th Ann. Int'l Symp. on Micro Architecture, 1995.

Koseki et al., "A Register Allocation Technique Using Register Existence Graph", Proc. of the Int'l Conf. on Parallel Processing, pp. 404–411, 1997.

*Primary Examiner*—Tariq R. Hafiz
*Assistant Examiner*—Kakali Chaki
*Attorney, Agent, or Firm*—McDermott, Will & Emery

[57] ABSTRACT

A method and apparatus for allocating registers when compiling code is provided. In response to determining there are insufficient registers associated with a first functional unit of a processor to allocate to a region of code, instructions associated with the region designated for execution on a first functional of processor that may be executed by second functional unit are detected. Those instructions generated for execution on the first functional unit are replaced with the instructions executed on the second functional unit.

20 Claims, 10 Drawing Sheets

```
main ( ) {
  int A,B;
  int U,V,W,X;

if (A=B) then
    U=U+V+(W+X) ;    } 604
}
```
602

Color Graph for General Purpose Unit

FUNCTIONAL UNIT SWITCHING FOR THE ALLOCATION OF REGISTERS

BACKGROUND OF THE INVENTION

1. Field of the Invention

The present invention relates to the optimization of code generated by a compiler, and in particular, to functional unit switching for the allocation of registers for the code being compiled.

2. Description of Related Art

An important function of an optimizing compiler is allocating physical registers to be used when code generated by the optimizing compiler is executed. Physical registers are actual hardware registers supported by the particular platform on which the code is executed. In some situations, code can be executed in the available physical registers without requiring any additional physical registers. However, in other situations, the execution of code requires more than the number of available physical registers. For example, for a sequence of instructions that performs a series of calculations, the number of intermediate values (e.g. variables, intermediate computations) which must be maintained may exceed the number of available physical registers. In this situation, another approach for allocating physical registers must be employed.

One such approach used by contemporary optimizing compilers is a multi-pass approach. In one pass, a set of virtual or "symbolic" registers is assigned to code. Virtual registers are sometimes considered to be infinite in number, but for practical reasons, are usually limited to some fairly large number. During a subsequent pass, the set of virtual registers are assigned to a set of physical registers. For situations when the number of virtual registers is less than or equal to the number of physical registers, assigning the set of virtual registers to the set of physical registers is relatively simple. However, when the number of virtual registers exceeds the number of available physical registers, then the set of virtual registers must be mapped to the set of physical registers. In the context of compilers, mapping a set of virtual registers to a set of physical registers refers to determining an assignment of the set of virtual registers to the set of physical registers so that all computations specified by this code can be performed in the set of physical registers.

One approach for mapping a set of virtual registers to a set of physical registers is known as the graph coloring approach which is described in U.S. Pat. No. 4,571,678 issued to Chaitin on Feb. 18, 1986. Generally, the graph coloring approach involves constructing and analyzing a register interference graph for each portion of the code. The register interference graph includes a number of nodes which represent the virtual registers. Pairs of nodes in the graph are connected when two variables represented by the nodes cannot simultaneously share a physical register at some point in time during the execution of the code, effectively representing a conflict between the two nodes.

The register interference graph is then analyzed and nodes having fewer connections than the number of available physical registers are removed from the graph. If all of the nodes can be removed from the graph, then a coloring can be determined. That is, all of the virtual registers can be mapped to physical registers. However, sometimes the register interference graph contains one or more nodes having more connections than the number of available physical registers. This means that the number of available hardware registers is insufficient to store all of the intermediate values specified by the code. Thus, some intermediate values must be stored in another storage medium such as memory.

The process of temporarily storing data to another storage medium such as memory is referred to as "spilling." Generally, spilling involves performing a spill operation, followed by one or more reload operations. The spill operation causes some specified data to be stored from a physical register into another storage medium, such as a runtime stack in memory. Each reload operation causes the specified data to be loaded or copied from the other storage medium into a physical register. Reload operations are typically performed when the specified data is required for a calculation.

In terms of the register interference graph, a spill is reflected in the graph by disconnecting a node from all other nodes and removing that node from the graph. Then the graph is rebuilt and analyzed again. This process is repeated until a mapping of the set of virtual registers to the set of physical registers is determined.

Figure 1:
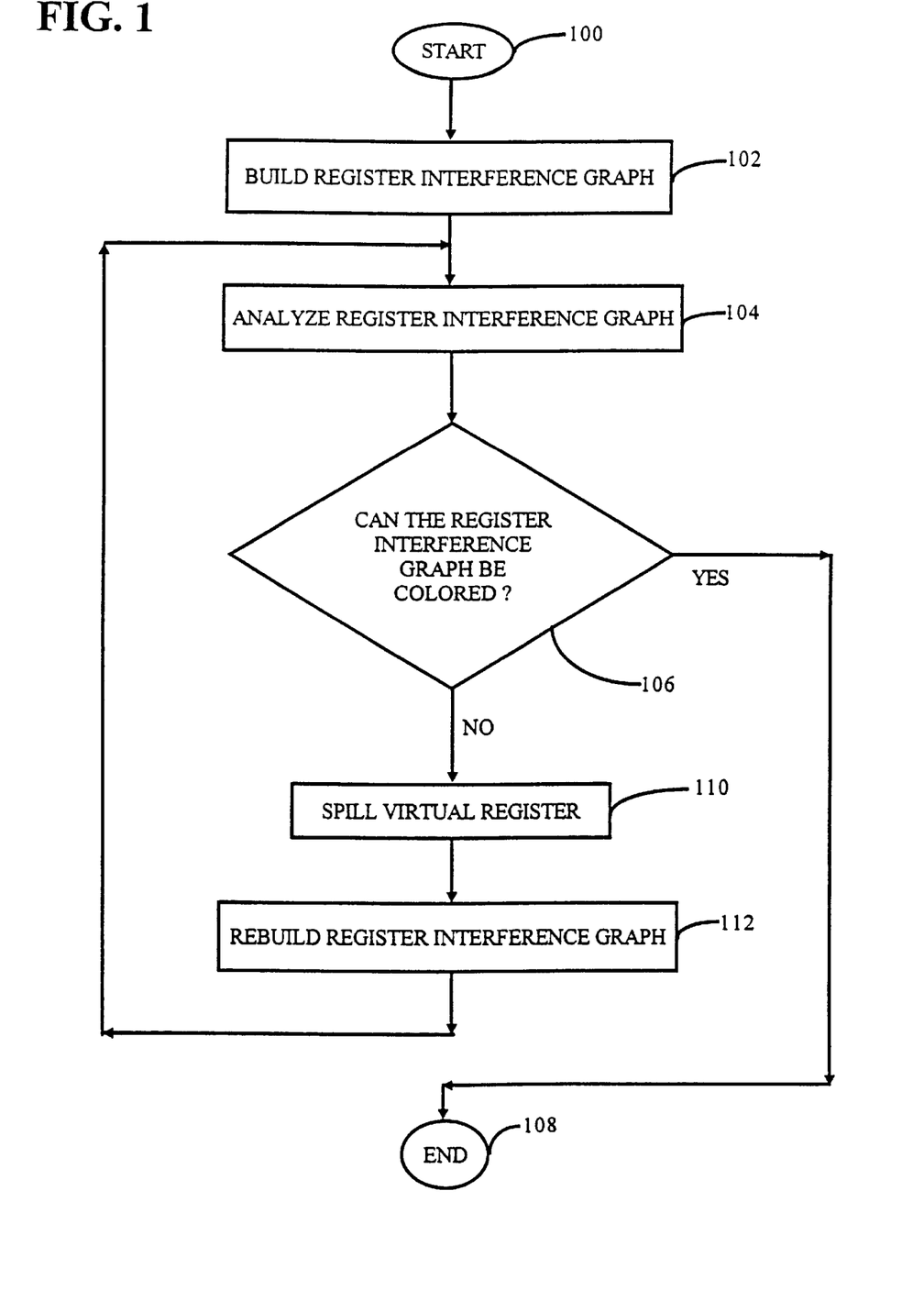
FIG. 1 is a flow chart showing the color graphing approach to allocating registers.

The high level approach for mapping a set of virtual registers to a set of physical registers according to the graph coloring approach is illustrated by the flow chart of FIG. 1. After starting in step 100, a register interference graph is built in step 102. Then in step 104, the register interference graph is analyzed. As previously described, analyzing the register interference graph involves removing any nodes which have fewer connections to other nodes than the number of available physical registers.

In step 106, a determination is made as to whether the register interference graph can be colored. As previously discussed, if all of the nodes can be removed from the graph, indicating that there are no conflicts, then the graph can be colored. If so, then the process is complete in step 108. On the other hand, if in step 106 the graph cannot be colored, then in step 110, one of the virtual registers is spilled, which eliminates the spilled register as a conflicted node in the graph. In step 112 the register interference graph is rebuilt and then steps 104 through 112 are repeated until the register graph is colored.

The Problem

Although the spilling approach allows a set of virtual registers to be mapped to a set of physical registers, the approach does have some disadvantages. One disadvantage is that write and read operations to secondary storage mediums, such as runtime stacks, often take more time to execute than write and read operations to central processing unit (CPU) registers. Furthermore, additional instructions must be executed to perform the spill and reload operations. This increases the overall time required to process a sequence of instructions which provide for the spilling of data.

Figure 2A:
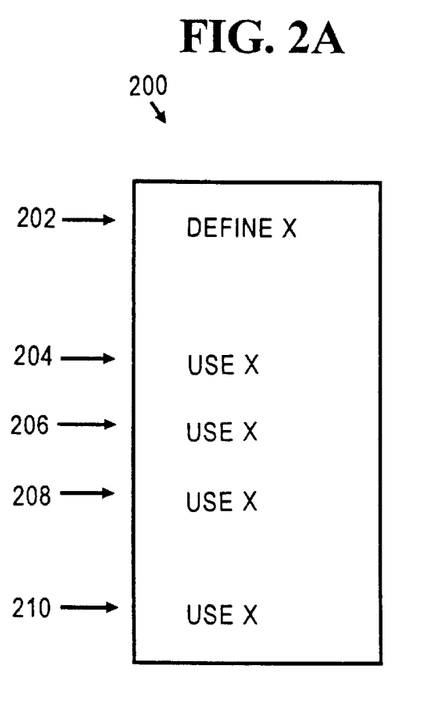
FIG. 2A and 2B shows region of code and the revisions made to the code in an example illustrating the color graphing approach.
Figure 2B:
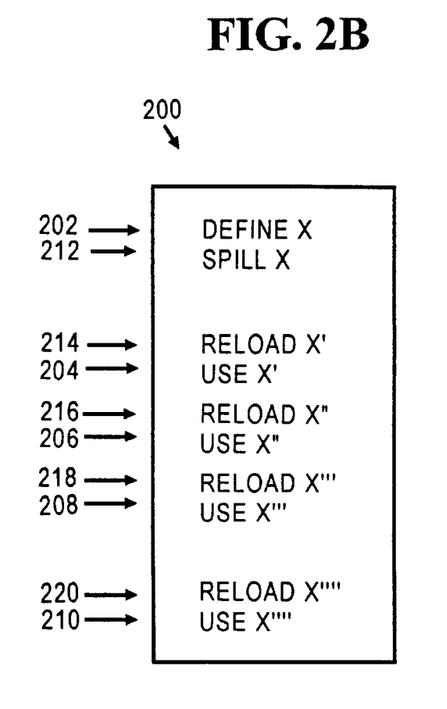

Consider the example illustrated by FIGS. 2A and 2B. A code block 200 includes code 202 which defines a variable X. Code block 200 also includes code 204, 206, 208 and 210, which use the variable X. Code block 200 may also include other code which is not illustrated.

FIG. 2B illustrates code block 200 which has been modified to reflect the spilling of variable X. Specifically, code 212 has been added immediately following code 202, to perform a spill operation on the variable X. As previously discussed, spilling a variable involves writing the variable from a physical register to another storage medium, such as a runtime stack in memory.

In addition, code 214 has been added immediately before code 204 to perform a reload operation on the variable X, which causes the variable X to be reloaded into a hardware register as X'. Code 204 then uses the reloaded variable X'.

Similarly, code 216 has been added immediately before code 206 to reload the variable X as X", which is then used by code 206. Also, code 218 and 220 have also been added to reload the variable X as X''' and X'''', respectively.

As is illustrated by code block 200 in FIG. 2B, the spilling of variable X involves both writing the variable X from a physical register to a memory location (a spill operation), but also reloading the variable X in each instance where the variable X is used in code block 200. This can adversely affect performance when a reload operation is added to a portion of code which is repeated many times, such as a loop.

In view of the need for spilling virtual registers to allow the mapping of a set of virtual registers to a set of physical registers, there is a need for an approach for allocating a set of virtual registers to a set of physical registers that reduces spilling.

SUMMARY OF THE INVENTION

A method and apparatus for allocating registers when compiling code is described. According to one aspect of the invention, in response to determining there are insufficient registers associated with a first functional unit of a processor to allocate to a region of code, instructions associated with the region designated for execution on a first functional unit of a processor, that perform operations that may be performed by a second functional unit, are detected. Those instructions generated for execution on the first functional unit are redirected to be executed on the second functional unit.

According to another aspect of the invention, the determination of whether there are sufficient registers to allocate on a first functional unit is made by determining whether the region of code may be colored. To detect which instructions that are generated for execution on the first functional unit may be switched for execution on the second unit, expression trees are generated. If an expression tree represents instructions which may be cost effectively switched from the first functional unit to the second functional unit, the switch is made. Finally, instructions are only switched when switching will not render the registers associated with second functional unit dirty. Dirty registers are a set of registers with a member that has been allocated at least once during compilation.

When there are insufficient registers associated with a functional unit to allocate, conventional measures are commonly undertaken to transform the code being compiled so that it may execute within the number of available registers associated with that functional unit. These conventional measures degrade the performance of the code. The methods and apparatus described herein make available for allocation other sets of registers associated with other functional units, thereby avoiding more costly conventional measures.

The foregoing and other features, aspects and advantages of the present invention will become more apparent from the following detailed description of the present invention when taken in conjunction with the accompanying drawings.

BRIEF DESCRIPTION OF THE DRAWINGS

The present invention is illustrated by way of example, and not by way of limitation, in the Figures of the accompanying drawings and in which like reference numerals refer to similar elements and in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, through not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DETAILED DESCRIPTION OF THE PREFERRED EMBODIMENT

Figure 3:
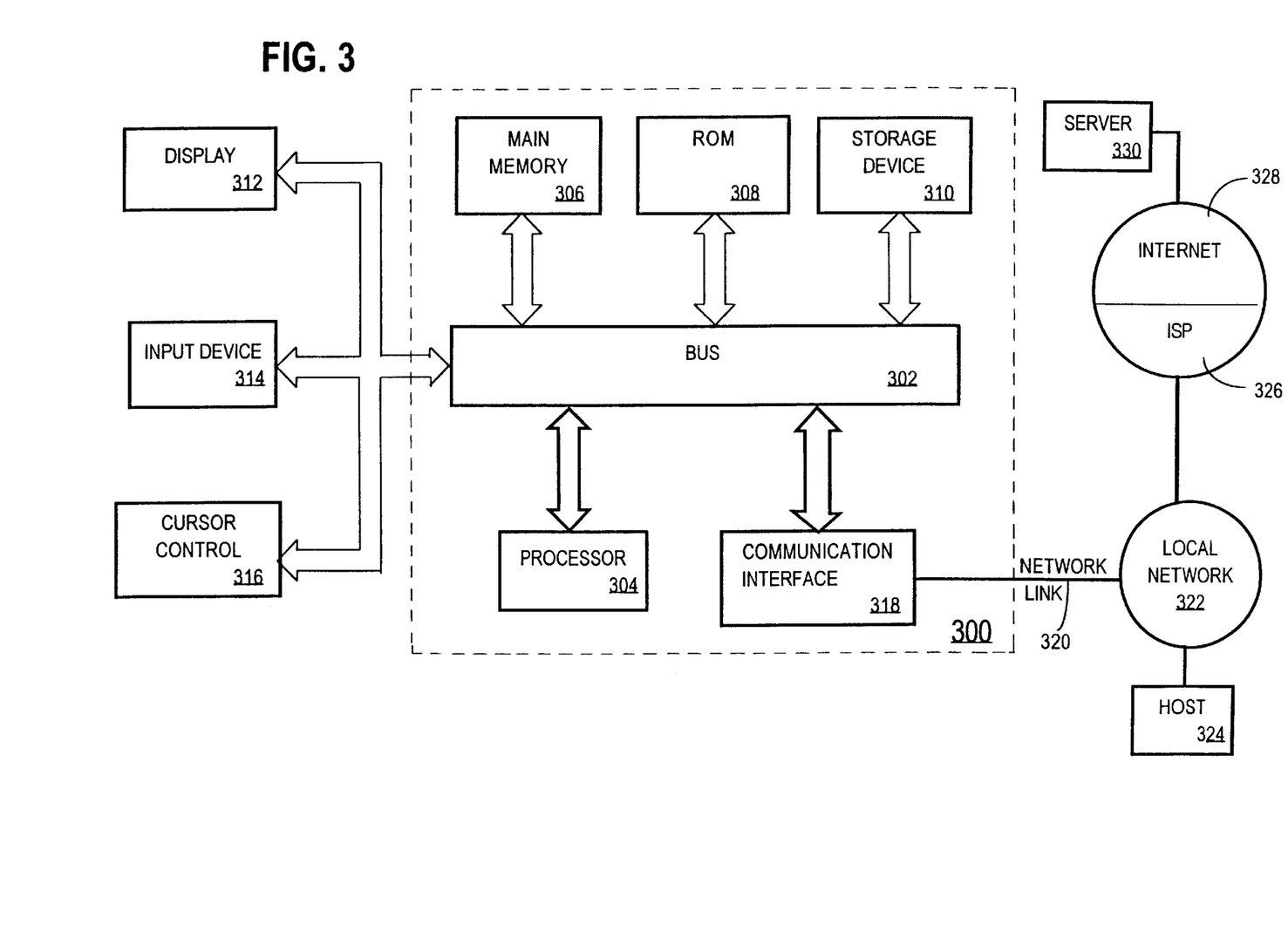
FIG. 3 is a block diagram of a computer system on which the present invention may be implemented.

A method and apparatus for allocating registers is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.
Hardware Overview FIG. 3 is a block diagram which illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions by processor 304. Computer system 300 also includes a read only memory (ROM) 308 or other static storage device coupled to bus 302 for storing static information and instructions for processor 304. A storage device 310, such as a magnetic disk or optical disk, is also provide and coupled to bus 302 for storing information and instructions.

Computer system 300 may also be coupled via bus 302 to a display 312, such as a cathode ray tube (CRT), for displaying information to a computer user. An input device 314, including alphanumeric and other keys, is also provided and coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), which allows the device to specify positions in a plane.

The invention is related to the use of computer system 300 to allocating registers. According to one embodiment of the invention, allocating registers is provided by computer system 300 in response to processor 304 executing sequences of instructions contained in main memory 306. Such instructions may be read into main memory 306 from another computer-readable medium, such as storage device 310. However, the computer-readable medium is not limited to devices such as storage device 310. For example, the computer-readable medium may include a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read. Execution of the sequences of instructions contained in main memory 306 causes processor 304 to perform the process steps previously described. In alternative embodiments, hard-wired circuitry may be used in place of or in combination with software instructions to implement the invention. Thus, embodiments of the invention are not limited to any specific combination of hardware circuitry and software.

Computer 300 also includes a communication interface 318 coupled to bus 302. Communication interface 308 provides a two-way data communication coupling to a network link 320 to a local network 322. For example, if communication interface 318 is an integrated services digital network (ISDN) card or a modem, communication interface 318 provides a data communication connection to the corresponding type of telephone line. If communication interface 318 is a local area network (LAN) card, communication interface 318 provides a data communication connection to a compatible LAN. Wireless links are also possible. In any such implementation, communication interface 318 sends and receives electrical, electromagnetic or optical signals which carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals which carry digital data streams. The signals through the various networks and the signals on network link 320 and through communication interface 318, which carry the digital data to and from computer 300 are exemplary forms of carrier waves transporting the information.

Computer 300 can send messages and receive data, including program code, through the network(s), network link 320 and communication interface 318. In the Internet example, a server 330 might transmit a requested code for an application program through Internet 328, ISP 326, local network 322 and communication interface 318. In accord with the invention, one such downloaded application provides for the method for expression tree detection as described herein.

Figure 4:
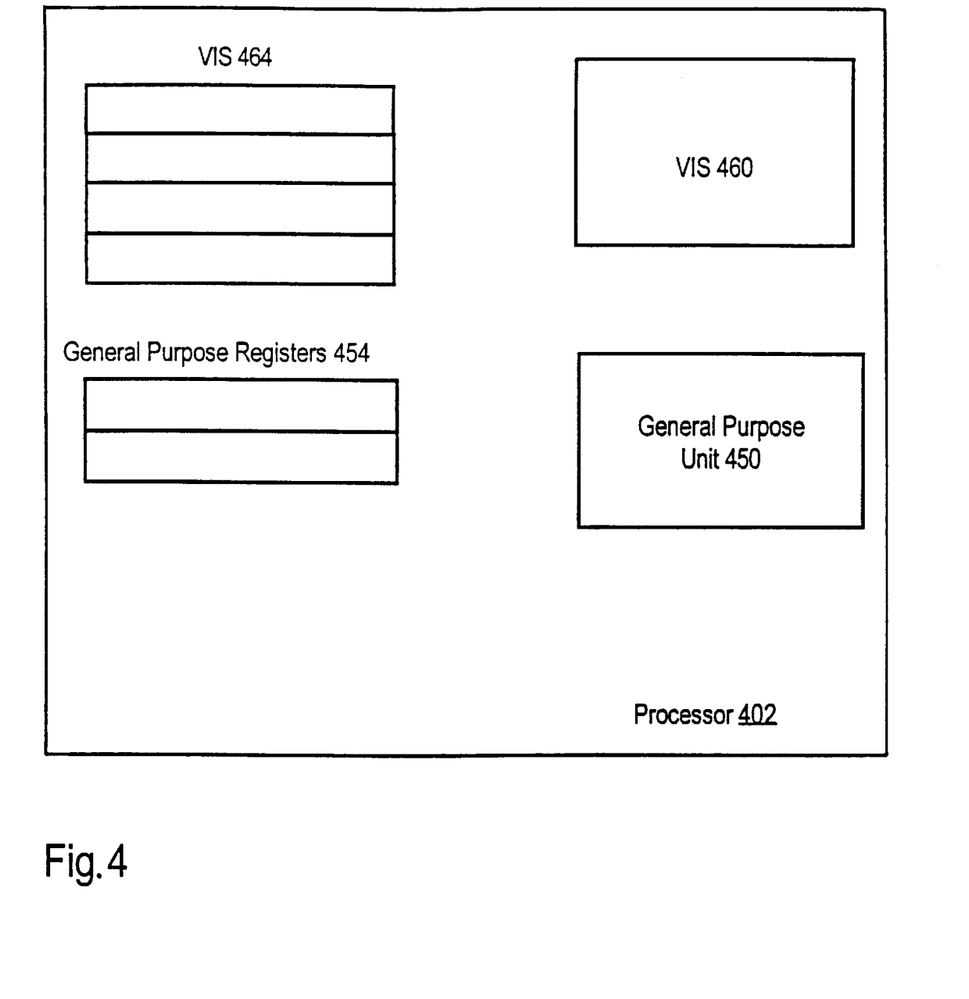
FIG. 4 is block diagram of a processor showing several functional units with overlapping instruction sets.

The received code may be executed by processor 304 as it is received, and/or stored in storage device 310, or other non-volatile storage for later execution. In this manner, computer 300 may obtain application code in the form of a carrier wave.
Overlapping Functional Units FIG. 4 shows processor 302 in more detail. Shown in FIG. 4 are visual instructions set ("VIS") unit 460 and general purpose unit 450. VIS unit 460 and general purpose unit 450 are functional units that are part of processor 302. Functional units are units on processor 302 that perform a given set of instructions executed by processor 302. For example, general purpose unit 450 performs instructions such as integer add and integer multiply. VIS 460 performs instructions related to graphics operations.

A functional unit operates on one or more sets of registers. The registers specified by instructions executed by a functional unit are the registers operated upon by the functional unit. Assume for purposes of illustrations that VIS unit 460 operates only on VIS registers 464, and that unit 450 operates only on general purpose registers 454.

Some of the instructions executed by one functional unit function similarly to instructions executed by another functional unit. Under the proper conditions, such instructions function virtually identically. Instructions on one unit that can function virtually identically to instructions executed by another functional unit are herein referred to as overlapping instructions.

For example, some instructions executed by Sun Microsystems's UltraSPARC I™ processor (referred to as "Sparc™") are overlapping instructions. Instructions involving logic operations that are executed by Sparc's™ general purpose unit overlap with instructions executed by Sparc's™ VIS unit. In addition, another set of instructions involving addition, subtraction, and multiplication that are executed by Sparc's™ general purpose unit overlap with instructions executed by the Sparc's™ VIS unit. This latter set of instructions function virtually identically when the overflow generated by the instructions is irrelevant.

A mapping of the overlapping instructions is available to the compiler 530. The mapping maps an instruction executed by one functional unit to the corresponding overlapping instruction that is executed by another functional unit. For example, the mapping maps integer add executed on general purpose unit 450 to integer add executed on VIS unit 460. The mapping is not necessarily one to one. In other words, one or more instructions executed by one functional unit may as a group map to one or more instructions executed by another functional unit.

Note that the configuration of functional units and registers shown in FIG. 4 shows a VIS unit with four VIS registers, and a general purpose unit with two general purpose registers. The configuration shown in FIG. 4 is intended to be illustrative. The present invention is not limited to any particular type of configuration of functional units and registers. For example, the methods described herein are applicable to a processor with overlapping floating point and general purpose units, each unit operating on its own set of 32 registers.

Exemplary Compiler

Figure 5:
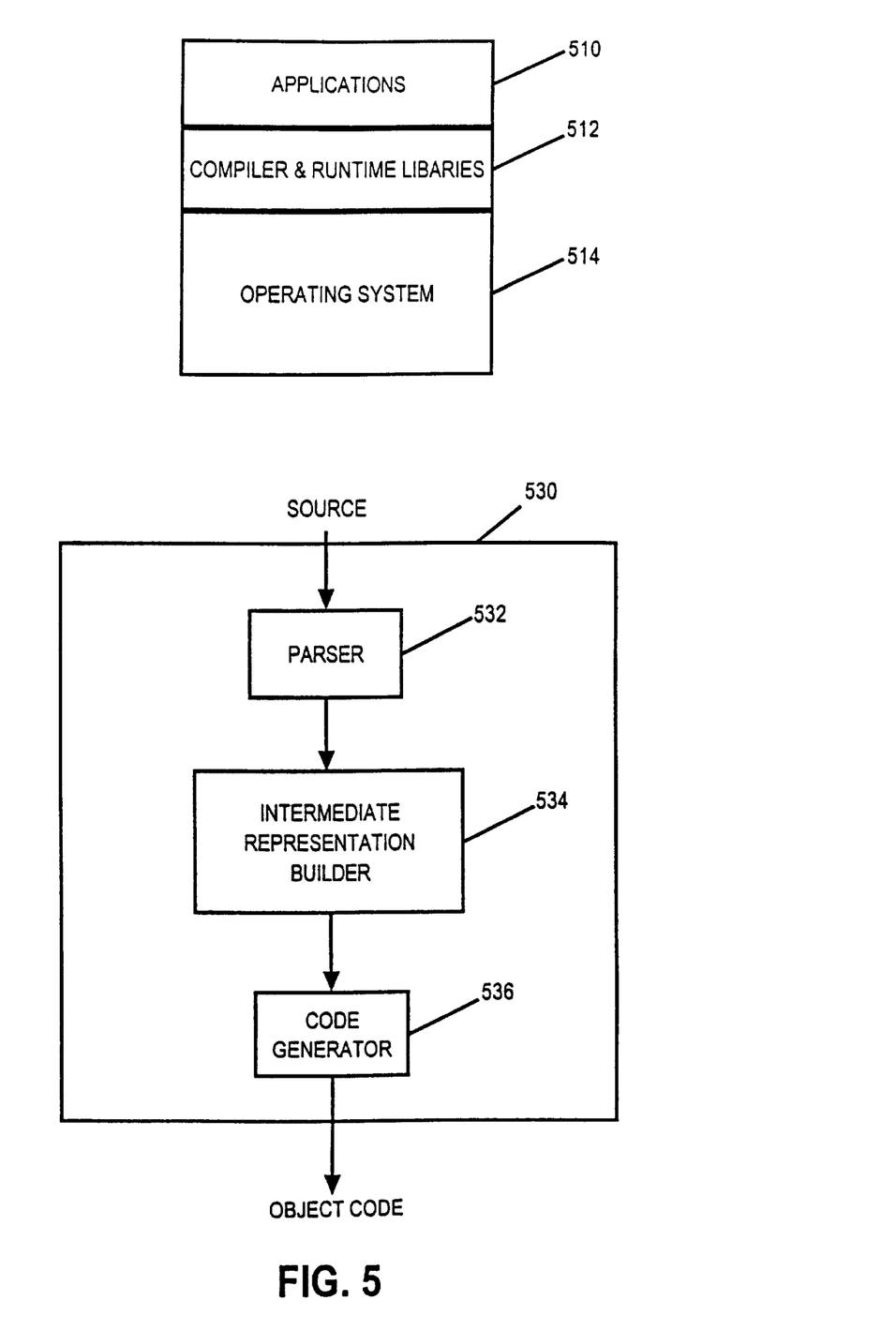
FIG. 5 shows a block diagram showing the software elements of a computer system comprising a high level compiler, and shows a functional diagram showing one embodiment of the high level language compiler.

Shown in FIG. 5 is a high level programming language compiler and its run time libraries 512 incorporating the teachings of the methods described herein. Also shown is an operating system 514 providing system services to the compiler and the run time libraries and the applications 510. The applications 510 are intended to represent a broad category of applications found in many computer systems and will not be described further. The run time libraries 512 and the operating system 514 are also intended to represent a broad category of system software found in most computer systems and will not be described further. The high level programming language compiler 530 will be described in further detail below. Referring now to FIG. 5, the functional block diagram illustrating one embodiment of the high level language compiler of FIG. 5 is shown. Shown is the high level language compiler 530 comprising a parser 532 and intermediate representation builder 534 and a code generator 536 incorporating the teachings of the methods described herein. These elements are sequentially coupled together. Together, they generate executable code, in response to received source code.

The parser 532 receives application source code as inputs, and tokenizes various expressions in the application source code. The intermediate representation builder 534 receives the tokenized expressions as inputs, and generates intermediate representations for these expressions. The code generator 536 receives the intermediate representations as inputs, and generates executable code, including allocation of registers. The code generator 536 allocates registers using techniques well known to those skilled in the arts and techniques described herein. For further descriptions on various parsers, intermediate representation builders, and code generators, see A. B. Aho and J. D. Ullman, *Compiler, Principles, Techniques, and Tools*, Addison-Wesley, 1985, pp. 146–388, and 463–584.

Allocating Registers

Figure 7:
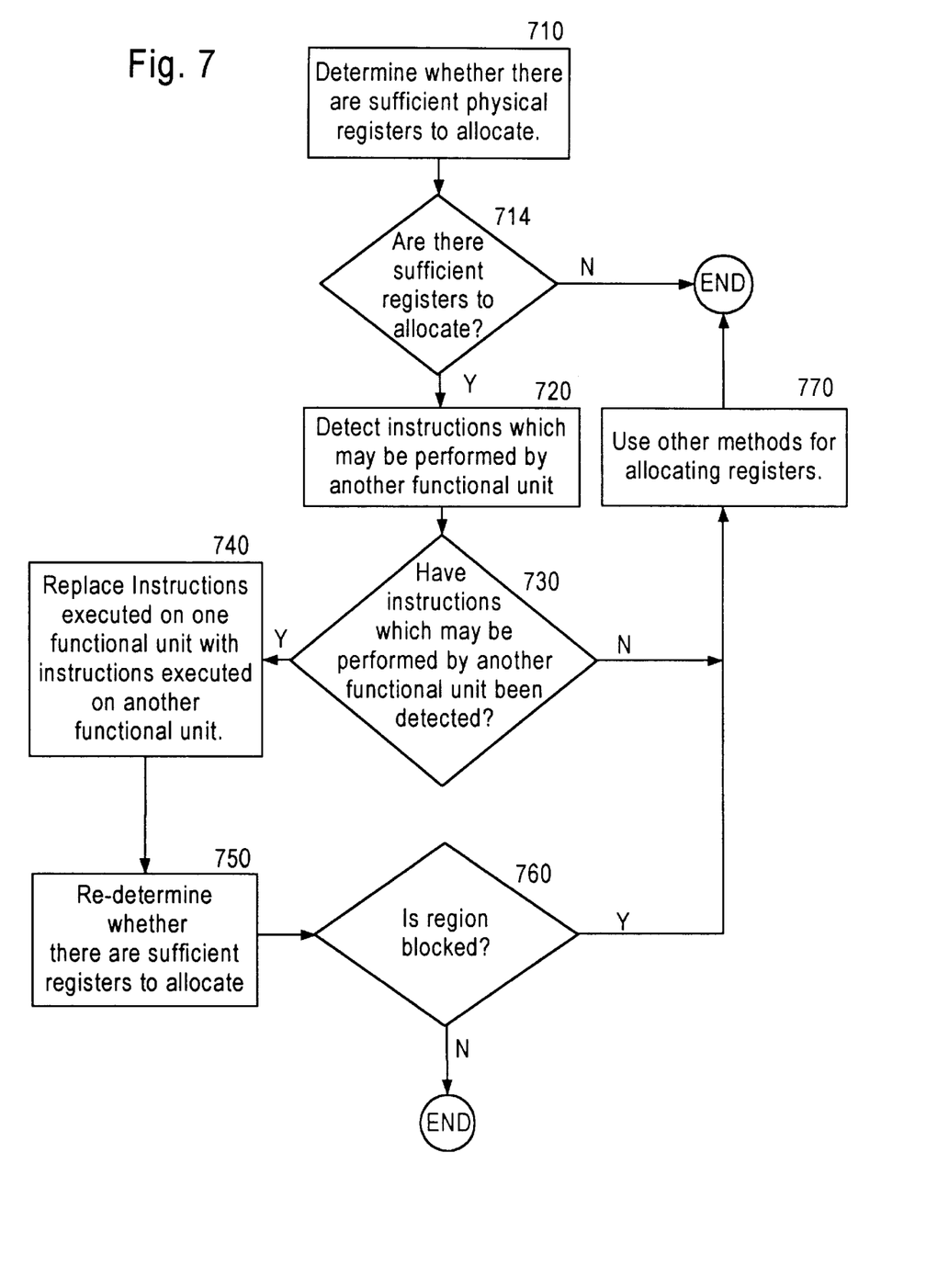
FIG. 7 is a flow chart showing the steps of method for allocating registers by switching instructions to another functional unit.

FIG. 7 shows the steps of a method which uses the overlap between functional units to efficiently allocate registers. To reduce or avoid spilling, the execution of computations being performed by instructions executed by one functional unit, are instead performed by the overlapping instructions of another functional, thereby making the registers upon which the other functional unit operates available for allocation.

The steps in FIG. 7 are performed on a region containing one or more blocks of code. A routine is decomposed into regions using a number of well known approaches, including hierarchical reduction of a routine's control flow graph. Another approach is described in Goebel, *Resister Allocation By Decomposing, Re-connecting and Coloring Hierarchical Program Regions*, U.S. Pat. No. 5,418,958, May 23, 1995.

Figure 6A:
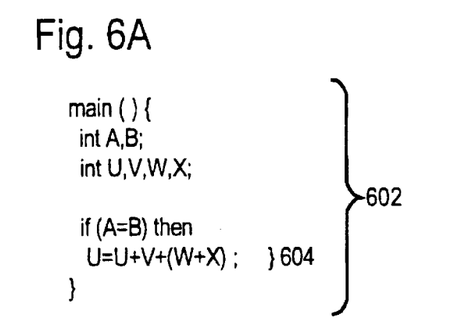
FIG. 6A shows a high level code representation of an exemplary region of code.
Figure 6B:
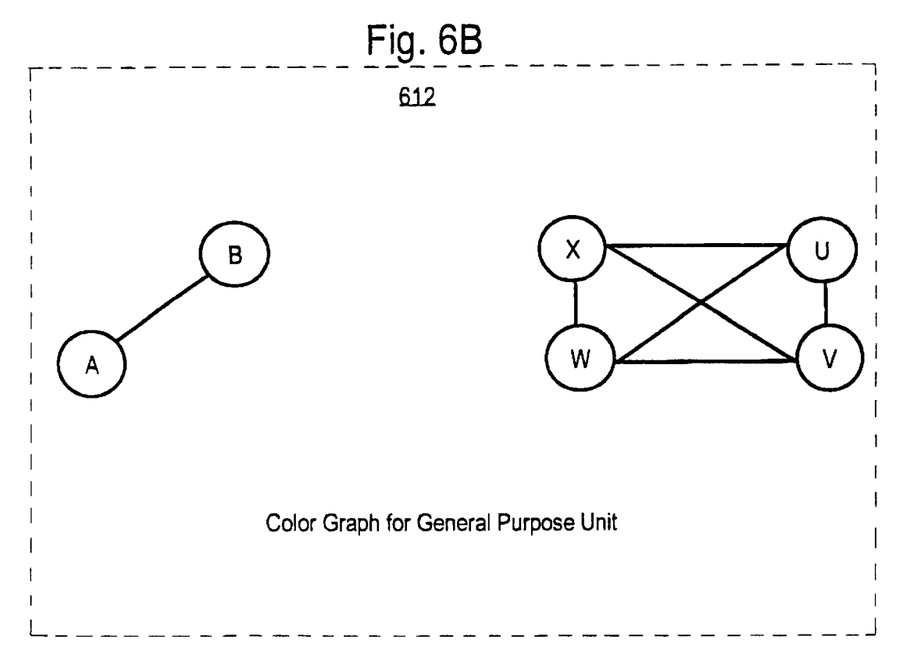
FIG. 6B is a color graph used to illustrate the allocation of physical registers before switching instructions to another functional unit.

FIGS. 6A, 6B, 6C, and 6D are used to illustrate the steps of FIG. 7. FIG. 6A shows region 600 and the high level code associated with region 600. FIG. 6B shows an interference graph associated with region 600 which code generator 536 generates for each functional unit before executing the steps shown in FIG. 7. For purposes of illustration, code generator 536 uses the color graphing approach in allocating physical registers except as described herein. Referring to FIG. 6B, register interference graph 612 is a register interference graph for the general purpose unit 450. No register interference graph is shown for the VIS unit 460 because there is no computation to allocate to registers with respect to this region at this point.

Referring to FIG. 7, at step 710, the register interference graph for each functional unit is analyzed to determine whether there are sufficient physical registers to allocate. As previously described, analyzing a register interference graph involves removing any nodes which have fewer connections to other nodes than the number of physical registers.

At step 714, a determination is made of whether there are a sufficient number physical registers to allocate to the nodes. A region is referred to as being "blocked" if any node in any register interference graph associated with the region cannot be removed. If the determination made is that the region is not blocked, then the region may be colored and every intermediate value can be allocated to a physical register, and execution of steps ceases for this region. Otherwise, control passes to step 714.

In this example, the register interference graph 612 (FIG. 6B) for the general purpose unit 450 shows the region is blocked. The region is blocked because more than one node has more than the number of available physical registers, which is two. Node X has three connections, node W has three connections, as well as node U and node V. Because the region is blocked, control passes to step 720.

At step 720, instructions performing operations which may be performed by instructions executed on another functional unit are detected. To detect such instructions, expression trees are generated. An expression tree is a hierarchical representation of a combination of intermediate values (e.g. variables, intermediate computations) and operators found in an expression. For example, consider expression 604 in FIG. 6A. The intermediate values and operators found in expression 604 are represented by expression tree 608. Compiler 530 finds each expression in the region of code and generates an expression tree. The generation of expression trees for a region of code and the use expression trees are well known to those skilled in the art.

Detecting instructions which may be performed with overlapping instructions of another functional unit entails consideration of various factors. One factor is whether any expression tree, or a portion of an expression tree, represents a particular expression which can be reduced to the overlapping instructions of another functional unit. Another factor involved in detecting expression trees which may be performed by another functional unit is whether it is cost effective, in terms of computer resources, to execute the expression represented by the expression tree using another functional unit and the registers operated upon by the other functional unit. Factors such as these, that are involved in the detection of instructions that may be performed by the overlapping instructions of another functional unit, shall be described in more detail.

Figure 8:
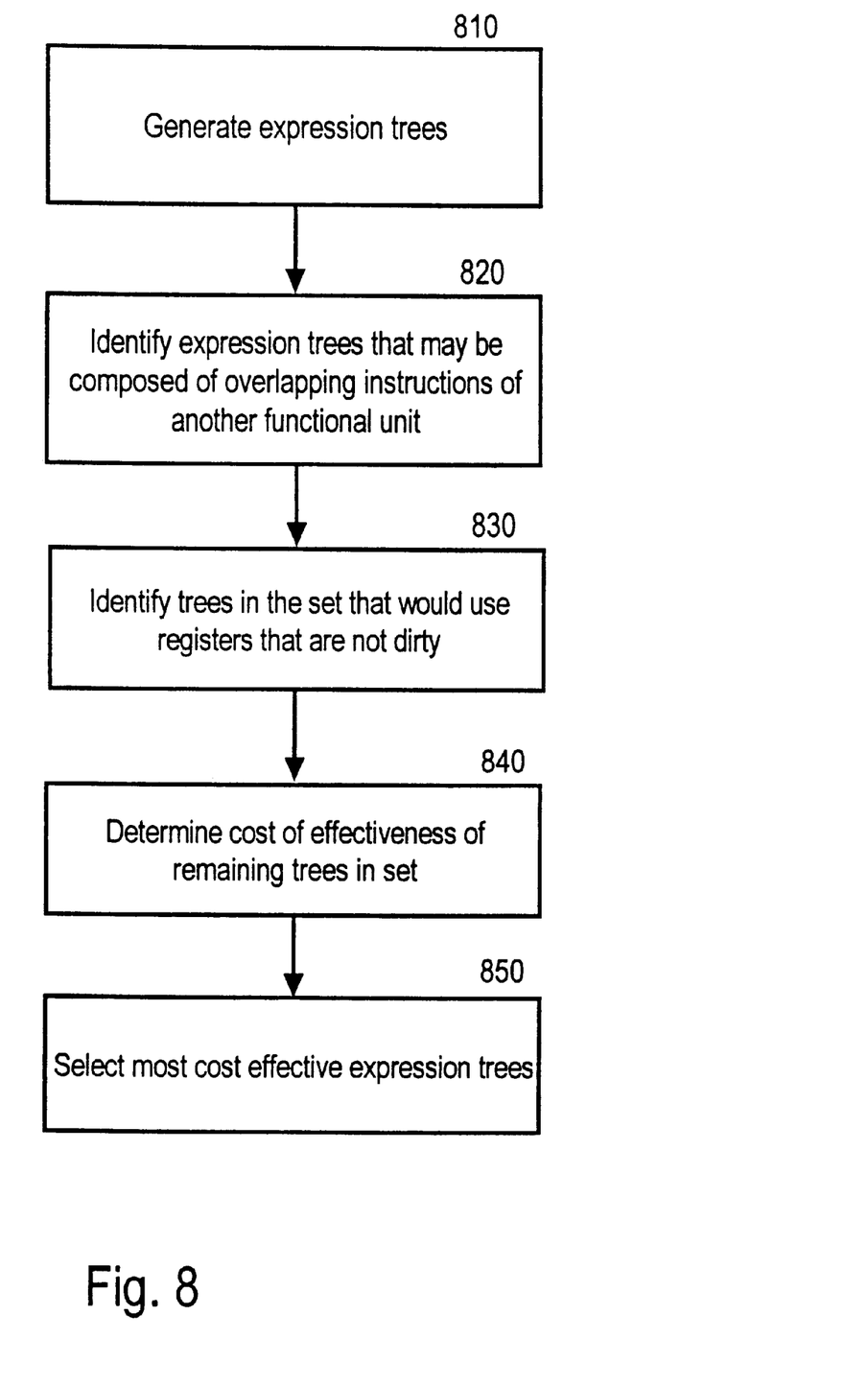
FIG. 8 is flow chart showing the steps of a method for detecting expression trees representing instructions subject to possible switching to another functional unit.

FIG. 8 shows an exemplary approach to detecting whether any instructions performing operations that be performed by overlapping instructions of another functional unit.

At step 730, a determination is made of whether any instructions which may be performed by another functional unit are detected. If no such instructions are detected, then control passes to step 770. Otherwise control passes to step 740.

In steps 770, other methods for allocating registers for the region are used by code generator 536. Other methods for allocating registers, such as the color graphing approach represented by in FIG. 1, are well known to those skilled in the art.

At step 740, instructions that were identified in step 720 are replaced with the new instructions needed to use the other functional unit. Specifically, using the mapping of overlapping instructions, each instruction identified in step 720 is replaced with the one or more instructions to which instruction identified in step 720 maps. The process of replacing a set of instructions with another set of instructions in order to perform the function performed by the first set instructions on a different functional unit is referred to as switching.

The new instructions that replace the instructions identified in step 720 may include both overlapping instructions that perform the same function as the instructions replaced by the switching, and additional instructions needed to support the switching. For example, switching from a first functional unit to a second functional unit may require transferring a value stored in a first register associated with one functional unit to a second register associated with another functional unit. To transfer the values, it may be necessary to generate additional instructions that store a value in the first register to a memory location and load that value from the memory location into the second register.

In this example, assume that it is determined that expressions represented by expression tree 608 (FIG. 6) can be reduced to the overlapping instructions of another functional unit, VIS unit 460 (FIG. 4). Further assume that is cost effective to use VIS unit 460 to switch the instructions corresponding to the expression tree. Therefore, instructions which may be performed using the overlapping instructions of another functional unit are detected. Control passes to step 740. In step 740, instructions identified in step 720 are switched by replacing them with corresponding overlapping instructions executable on VIS unit 460.

In step 750, another determination is made of whether there are sufficient physical registers to allocate. The register interference graphs are re-generated for each of the functional units and analyzed. Control passes to step 760.

In step 760, a determination is made of whether the region is blocked. If the region is still blocked, control passes to step 770. Otherwise performance of the steps shown in FIG. 7 ceases.

Figure 6C:
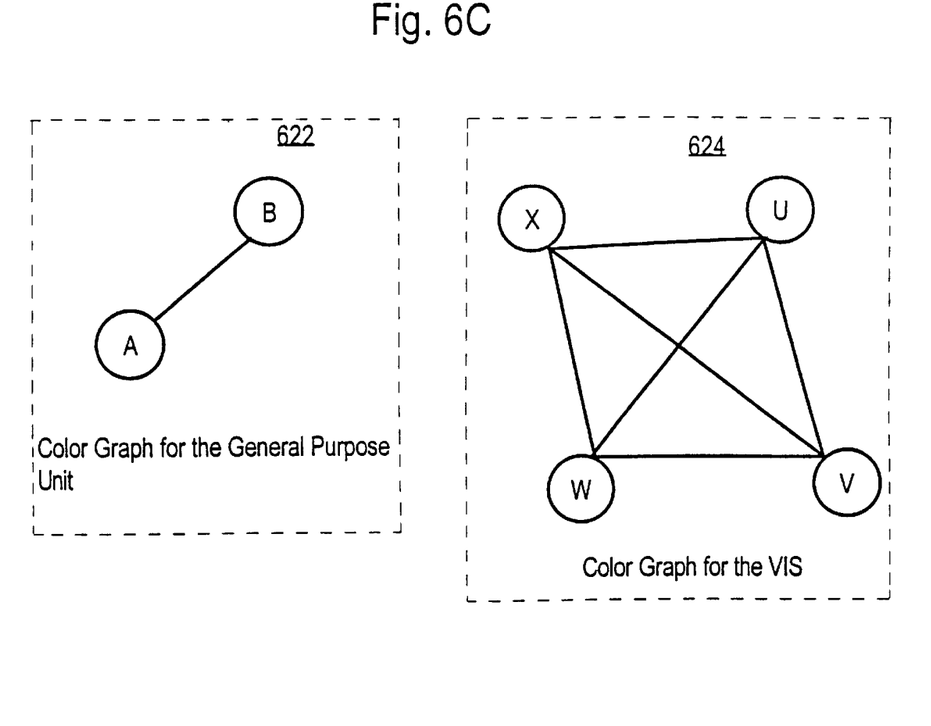
FIG. 6C is a color graph used to illustrate the allocation of physical registers after switching instructions to another functional unit.
Figure 6D:
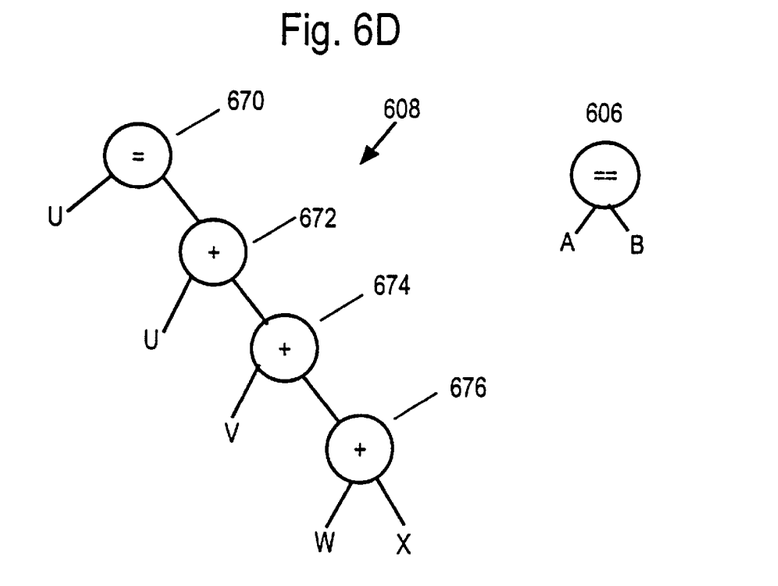
FIG. 6D shows expression trees generated for the region of code shown in FIG. 6A.

In this example, the register interference graphs shown in FIG. 6C are re-generated in step 750. Register interference graph 622 corresponds to the general purpose registers 454, and register interference graph 624 corresponds to VIS unit 460. The register interference graph for general purpose unit 450, register interference graph 622, shows that all its nodes have less connections than the number of physical registers in general purpose registers 454, which is two. Specifically, node A and node B each have only one connection. The register interference graph for VIS unit 460, register interference graph 624, shows that all its nodes have less connections than the number of physical registers in VIS registers 464, which is four. Specifically, node U, node V, node W, and node X each have only three connections.

Because all the nodes on both register interference graphs can have less connections than the number of their respective physical registers that are available, all the nodes may be removed. Therefore the region is no longer blocked, and performance of the steps shown in FIG. 7 ceases.

Expression Tree Detection

FIG. 8 shows one method for identify instructions which may be performed by another functional unit. The method involves generating a set of expression trees for a region of code and determining which expressions trees represent instructions which may be cost effectively switched.

At step 810, expression trees are generated for the region of code. As mentioned earlier, the generation of expression trees is well known to those skilled in the art. In some embodiments of the invention, the compiler 530 maintains data structures that are used to more quickly generate each expression tree (e.g. dependence graphs) contained in the code being compiled by compiler 530. FIG. 6D shows expression tree 606 and expression tree 608 which are generated for region 602.

At step 820, expression trees that may be composed of overlapping instructions of another functional unit ("switched") are identified. Expression trees that may be switched are those comprised of operators that may be performed by overlapping instructions of another functional unit, as illustrated in the current example.

Referring to FIG. 6D, expression tree 608 includes of three addition operators, operators 672, 674, and 676, that are being performed by three add instructions on general purpose unit 450. The assignment operator represented by operator 670, is being performed by a move instruction. The add instructions and move instructions overlap with instructions executed by VIS unit 460 (FIG. 4). Therefore, expression tree 606 is an expression tree which may be reduced to the overlapping instructions of another functional unit (i.e. VIS unit 460).

Expression tree 606 (FIG. 6D) contains one logical operator (i.e. "=", the equality operator), which may be performed by an overlapping instruction executed by VIS unit 460. Therefore, expression tree 606 is an expression tree which may be reduced to the overlapping instructions of another functional unit (VIS unit 460). Because expression tree 606 and expression tree 608 both may be reduced to the overlapping instructions of another functional unit, both expression tree 606 and expression 608 are identified in step 820.

Note that expression trees may be decomposed into smaller expression sub trees that are by themselves composed of operators that can be performed by overlapping instructions. Expression sub trees may be identified at step 820 as well.

At step 830, expression trees whose switching requires use of one or more registers in a set of registers that are not dirty are identified. A dirty set of registers may be defined as a set of registers that contains one register that has been referred to by one instruction generated for the program being compiled. In some embodiments of the invention, a dirty set of registers is defined as a set of registers containing at least one register that has been written to. Most compilers track whether a set of registers is dirty. When a set of registers is "dirty", the operating system must store the values of the set of registers in the context data maintained by the operating system for a program for swapping of the execution of programs. When, for a given program a set of registers is not dirty, because the program never uses the registers, the values in the register are not relevant to the execution of the program. Consequently, the value of registers that are not dirty are not maintained in a program's context data.

Maintaining the values in a set of registers in the context data of a program is expensive in terms of computer overhead. Switching that renders a set of registers dirty that would not be dirty otherwise is typically not cost effective. Therefore, any expression trees whose switching would render a set of registers dirty that would not otherwise be dirty are removed from further consideration for switching. In this example, assume that VIS registers are already dirty. Thus neither expression tree 606 nor expression tree 608 are identified as expressions whose switching would render a set of registers dirty that would otherwise not be dirty.

In step 840, the cost effectiveness of switching each of the remaining expression trees in the set is determined. Various factors may be applied to determine the cost effectiveness of switching an expression tree. For example, as mentioned earlier, switching may require that values stored in one set of registers be transferred to another set of registers using the memory of the computer system. The cost of transferring values in the registers in this manner may exceed or greatly diminish the savings achieved by avoiding spilling.

Another set of factors that are applied in conjunction with each other is the affect on the reduction of register pressure achieved by switching an expression tree on the functional unit from which an expression tree can be switched, and the number of available registers in the functional unit to which an expression tree can be switched. Register pressure is the number of live intermediate variables at a particular location in the code. Register pressure indicates the number of intermediate values competing for allocation to the physical registers of a functional unit.

In general, expression trees with largest number of intermediate values tend to have the greatest affect in reducing register pressure on the functional unit from which the expression tree is switched. However, switching a number of intermediate values that is greater than the available registers in the functional unit to which an expression can be switched can cause spilling in that functional unit. So, in general, expression trees with the largest number of intermediate values that do not exceed the available number of physical registers tend to be more cost effective than expression trees with lesser number of intermediate values.

The factors described above can be illustrated by the current example. Assume the four registers associated with VIS unit 460, VIS registers 464, are not allocated to any physical register.

The first factor applied is the application of the factor involving the transfer of values between registers in memory caused by switching. In regard to expression tree 608, no intermediate value represented by expression tree 608 is required by any other computation within region of code 602. On the other hand, no intermediate value represented by expression tree 606 is required by any other computation within region of code 602 as well. Thus no value in any register must be transferred to another register via memory if either expression tree 608 or expression tree 606 is switched. Thus when applying the factor involving the transfer of values between registers via memory caused by switching, neither expression tree 608 or 606 is more cost effective than the other.

The next factor applied is the factor involving the reduction of register pressure on the functional unit from which an expression can be switched and the number of registers available on the functional unit to which an expression tree may be switched. Expression tree 608 has four intermediate values, which do not exceed the number of available registers on VIS unit 460. Expression tree 606 has two intermediate values, which also does not exceed the number of available physical registers on VIS unit 460. Because expression tree 608 is an expression tree with the largest number of intermediate values that does not exceed the number of physical registers on VIS unit 460, expression tree 608 is more cost effective than expression tree 606.

At step 850, the most cost effective expression tree for switching is selected for switching. In this example, based on the application of the factors discussed, expression tree 608 is selected for switching.

Figure 9:
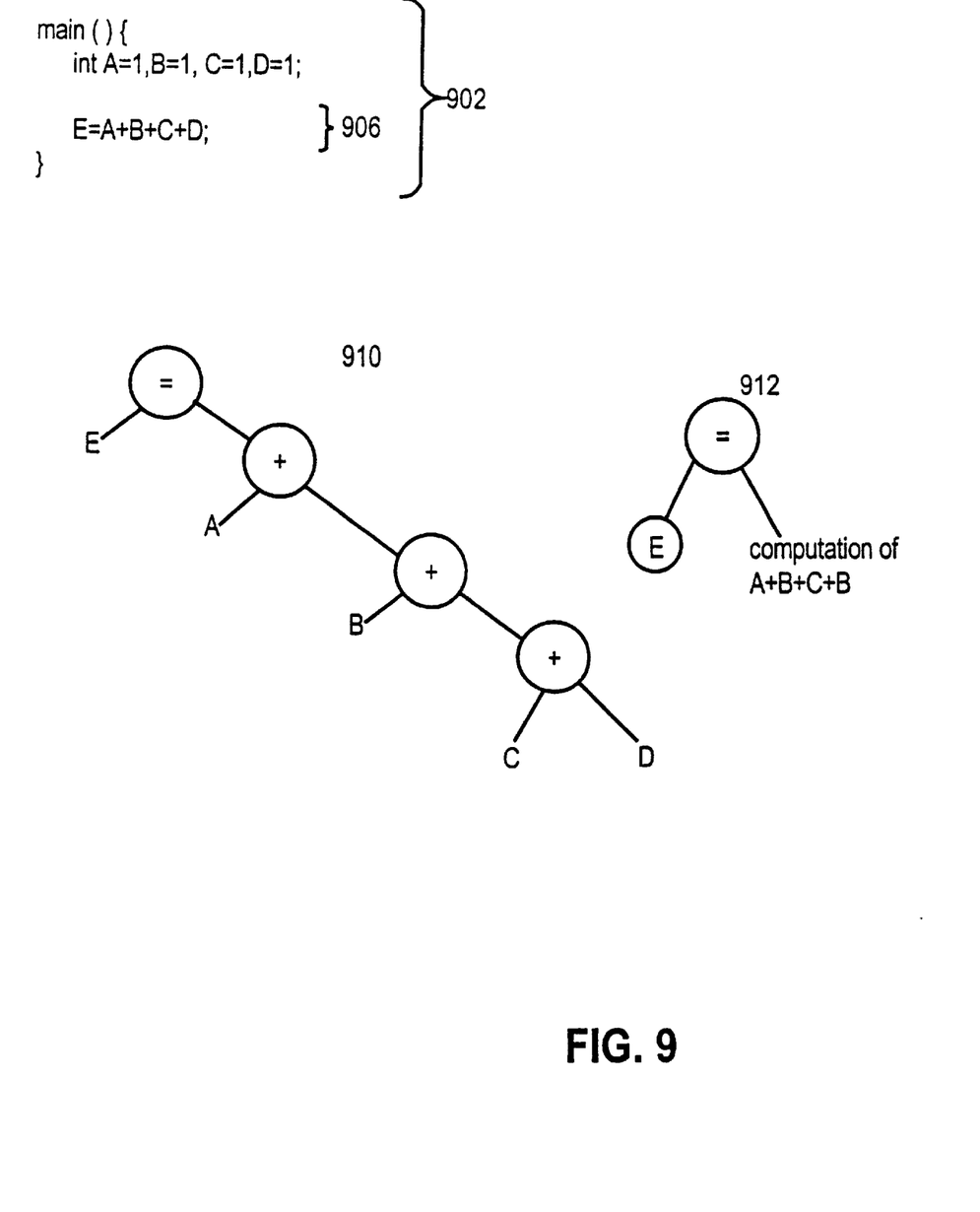
FIG. 9 shows a high level code representation of a region of code and expression trees representing instructions that may not be cost effectively switched to another functional unit.

Consider region 902 as another example demonstrating application of factors affecting cost effectiveness described in step 840. Assume further that there are four general purpose registers 454, and two VIS registers 464. Expression tree 910 represents the only expression, expression 906, contained in region 902. Assume that the cost effectiveness of switching expression tree 912 is being determined in step 840. Finally, assume expression tree 912 is formed by decomposing expression tree 910.

Because expression tree 912 requires the intermediate computation represented by "A+B+C+D", switching expression tree 912 requires the transfer of a value in the physical register in general purpose registers 454 containing this intermediate computation to a register in VIS registers 464. As mentioned before, the transfer would be accomplished via the memory. Switching expression tree 912 permits allocating one register of VIS registers 464 to the variable "e", thus avoiding one spill. However, the savings of avoiding one spill are reduced or eliminated by the cost of transferring the value of intermediate computation represented by "A+B+C+D" between registers.

Those skilled in the art will recognize that other factors other than those described herein can be applied to determining the cost effectiveness of switching branches. Therefore, it is understood that the present invention is not limited to the application of the factors described herein. For example, the cost effectiveness of switching an expression tree may depend on the whether an overlapping instruction executed by one functional unit can be executed as fast as the corresponding overlapping instruction of another functional unit. Cost effectiveness may also depend on whether a particular processor provides a mechanism for moving a value in a register from one set of registers to a register in another set of registers without resorting to memory.

In some embodiments on the invention, the methods for detecting instructions which may be performed by another functional unit can be packaged as utility to optimize regions. Parallelism of the compiled code can thereby be increased by switching the execution of some instructions to another functional unit.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. In a computer system, a method of minimizing registers spills when allocating a first set of registers to be used during the execution of a set of computer instructions, wherein the first set of registers is associated with a first functional unit, the method comprising the steps of:

detecting whether a first subset of computer instructions from said set of computer instructions may be executed by a second functional unit, said first subset of computer instructions specifying the use of one or more registers from said first set of registers; and if detecting that said first subset of computer instructions may be executed by said second functional unit, then performing the steps of:

generating a second subset of computer instructions, wherein said second subset of computer instructions specifies the use of a second subset of registers associated with said second functional unit, and replacing said first subset of computer instructions with said second subset of computer instructions.

2. The method of claim 1, wherein:

the method includes the step of determining whether there are sufficient registers from said first set of registers to allocate to each intermediate value in said set of computer instructions requiring any register from said first set of registers; and the step of detecting is performed in response to determining that there are insufficient registers from said first set of registers to allocate to each intermediate value in said set of computer instructions requiring a register from said first set of registers.

3. The method of claim 2, wherein the step of detecting whether said first subset of computer instructions may be executed by said second functional unitincludes detecting whether a second set of registers associated with said second functional unit is dirty, wherein said second set of registers is dirty if any register from said second set of registers has been previously allocated to any intermediate value.

4. The method of claim 2, wherein the method of detecting includes the steps of:

generating one or more expression trees based on said set of computer instructions; and identifying a set of expression trees representing instructions executable by said second functional unit.

5. The method of claim 4, wherein:

the method further include the steps of:

determining a cost effectiveness associated with a particular expression tree from said set of expression trees, said cost effectiveness associated with any expression tree being based on executing any instructions represented by said particular expression tree on said second functional unit, and selecting said particular expression tree from said set of expression trees based on the cost effectiveness associated with said particular expression tree; and the step of generating said second subset of computer instructions includes generating said second subset of computer instructions based on said particular expression tree.

6. The method of claim 4, further including the step of selecting a particular expression tree from said set of expression trees based on there being sufficient registers from a second set of registers to allocate to any intermediate value required by instructions represented by said particular expression tree, said second set of registers being associated with said second functional unit.

7. The method of claim 1, wherein:

the method includes the step of determining whether said set of computer instructions may be colored; and the step of detecting is performed in response to detecting that said set of computer instructions may not be colored.

8. A computer program embodied in a computer-readable medium for minimizing register spills when allocating a first set of registers associated with a first functional unit to be used during the execution of a set of computer instructions, said computer program comprising:

a first code segment for detecting whether a first subset of computer instructions may be executed by a second functional unit, said first subset of computer instructions specifying the use of one or more registers from said first set of registers; and a second code segment for generating a second subset of computer instructions when detecting that said first subset of computer instructions may be executed by said second functional unit, wherein said second subset of computer instructions specifies the use of a second subset of registers associated with said second functional unit.

a third code segment for replacing said first subset of computer instructions with said second subset of computer instructions in response to generating said second subset of computer instructions.

9. The computer program embodied in a computer readable medium of claim 8, wherein:

the computer program further comprising a fourth code segment for determining whether there are sufficient registers from said first set of registers to allocate to each intermediate value in said set of computer instructions requiring any register from said first set of registers, wherein said first set of registers is associated with said first functional unit; and the first code segment further includes code for detecting whether said first subset of computer instructions may be executed by said second functional unit in response to determining that there are insufficient registers from said first set of registers to allocate to each intermediate value in said set of computer instructions requiring a register from said first set of registers.

10. The computer program embodied in a computer readable medium of claim 9, wherein the second code segment further includes code for detecting whether said first subset of computer instructions may be executed by said second functional unit by detecting whether a second set of registers associated with said second functional unit is dirty, wherein said second set of registers is dirty if any register from said second set of registers has been previously allocated to any intermediate value.

11. The computer program embodied in a computer readable medium of claim 9, further comprising:

a sixth code segment for generating one or more expression trees based on said set of computer instructions; and a seventh code segment for identifying a set of expression trees representing instructions executable by said second functional unit.

12. The computer program embodied in a computer readable medium of claim 8, wherein:

the computer program further comprising a fifth code segment for determining whether said set of computer instructions may be colored; and the first code segment further includes code for detecting whether said first subset of computer instructions may be executed by said second functional unit in response to detecting that said set of computer instructions may not be colored.

13. A computer system comprising:

a memory;

a processor coupled to said memory;

a compiler stored in said memory for execution by said processor;

said compiler adapted to allocate a first set of registers to be used during the execution of a set of computer instructions, wherein said first set of registers is associated with a first functional unit;

said compiler adapted to detect whether a first subset of computer instructions may be executed by a second functional unit, said first subset of computer instructions specifying the use of one or more registers from said first set of registers; and said compiler adapted to respond to detecting that said first subset of computer instructions may be executed by said second functional unit, by:

generating a second subset of computer instructions, wherein said second subset of computer instructions specified the use of one or more registers from a second subset of registers associated with said second functional unit, and replacing said first subset of computer instructions with said second subset of computer instructions.

14. The computer system of claim 13, further comprising:

said compiler adapted to determine whether there are sufficient registers from said first set of registers to allocate to each intermediate value in said set of computer instructions requiring any register from said first set of registers; and said compiler adapted to detect in response to determining that there are insufficient registers from said first set of registers to allocate to each intermediate value in said set of computer instructions requiring a register from said first set of registers.

15. The computer system of claim 13, further comprising:

said compiler adapted to determine whether said set of computer instructions may be colored; and said compiler adapted to detect in response to detecting that said set of computer instructions may not be colored.

16. The computer system of claim 13, further comprising said compiler adapted to detect whether said first subset of computer instructions may be executed by said second functional unit by detecting whether a second set of registers associated with said second functional unit is dirty, wherein said second set of registers is dirty if any register from said second set of registers has been previously allocated to any intermediate value.

17. A computer data signal embodied in a carrier wave and representing a computer program for minimizing register spills when allocating a first set of registers associated with a first functional unit to be used during the execution of a set of computer instructions, said computer program comprising:

a first code segment for detecting whether a first subset of computer instructions may be executed by a second functional unit, said first subset of computer instructions specifying the use of one or more registers from said first set of registers; and a second code segment for generating a second subset of computer instructions when detecting that said first subset of computer instructions may be executed by said second functional unit, wherein said second subset of computer instructions specifies the use of a second subset of registers associated with said second functional unit;

a third code segment for replacing said first subset of computer instructions with said second subset of computer instructions in response to generating said second subset of computer instructions.

18. The computer data signal representing a computer program of claim 17, wherein:

the computer program further comprising a fourth code segment for determining whether there are sufficient registers from said first set of registers to allocate to each intermediate value in said set of computer instructions requiring any register from said first set of registers, wherein said first set of registers is associated with said first functional unit; and the first code segment further includes code for detecting whether said first subset of computer instructions may be executed by said second functional unit in response to determining that there are insufficient registers from said first set of registers to allocate to each intermediate value in said set of computer instructions requiring a register from said first set of registers.

19. The computer data signal representing a computer program of claim 18, wherein the second code segment further includes code for detecting whether said first subset of computer instructions may be executed by said second functional unit by detecting whether a second set of registers associated with said second functional unit is dirty, wherein said second set of registers is dirty if any register from said second set of registers has been previously allocated to any intermediate value.

20. The computer data signal representing a computer program of claim 17, wherein:

the computer program further comprising a fifth code segment for determining whether said set of computer instructions may be colored; and the first code segment further includes code for detecting whether said first subset of computer instructions may be executed by said second functional unit in response to detecting that said set of computer instructions may not be colored.

* * * * *